US010146787B2

(12) United States Patent
Bashyam et al.

(10) Patent No.: US 10,146,787 B2
(45) Date of Patent: Dec. 4, 2018

(54) TRANSFERRING DIFFERENCES BETWEEN CHUNKS DURING REPLICATION

(71) Applicant: Quest Software Inc., Aliso Viejo, CA (US)

(72) Inventors: Murali Bashyam, Fremont, CA (US); Sreekanth Garigala, Sunnyvale, CA (US)

(73) Assignee: Quest Software Inc., Aliso Viejo, CA (US)

( * ) Notice: Subject to any disclaimer, the term of this patent is extended or adjusted under 35 U.S.C. 154(b) by 201 days.

(21) Appl. No.: 13/952,062

(22) Filed: Jul. 26, 2013

(65) Prior Publication Data

US 2015/0032978 A1    Jan. 29, 2015

(51) Int. Cl.
*G06F 17/30* (2006.01)
*G06F 11/14* (2006.01)

(52) U.S. Cl.
CPC .... *G06F 17/30159* (2013.01); *G06F 11/1453* (2013.01)

(58) Field of Classification Search
CPC .... G06F 11/1453; G06F 3/065; G06F 3/0604; G06F 3/0683; G06F 3/0608; G06F 3/064; G06F 3/0641; G06F 3/067
See application file for complete search history.

(56) References Cited

U.S. PATENT DOCUMENTS

| 8,631,052 | B1 * | 1/2014 | Shilane et al. | 707/825 |
|---|---|---|---|---|
| 8,712,978 | B1 * | 4/2014 | Shilane et al. | 707/693 |
| 9,235,475 | B1 * | 1/2016 | Shilane | G06F 11/1453 |
| 2008/0244204 | A1 * | 10/2008 | Cremelie et al. | 711/162 |
| 2010/0125553 | A1 * | 5/2010 | Huang et al. | 707/661 |
| 2011/0040728 | A1 * | 2/2011 | Akirav | G06F 11/2094 |
| | | | | 707/634 |
| 2012/0084518 | A1 * | 4/2012 | Vijayan et al. | 711/162 |

(Continued)

OTHER PUBLICATIONS

Dubois, Laura et al., "Backup and Recovery: Accelerating Efficiency and Driving Down IT Costs Using Data Deduplication", White Paper, IDC, Retrieved from the Internet: <http://www.usicorp.com/Doc/USI%20White%20Papers/idc-20090519-data-deduplication.pdf (Feb. 1, 2010)>, Accessed on Dec. 29, 2013, Feb. 2010, 16 pgs.

(Continued)

*Primary Examiner* — Michael Krofcheck
(74) *Attorney, Agent, or Firm* — Maschoff Brennan

(57) ABSTRACT

Techniques and mechanisms described herein facilitate the replication of data between storage nodes. According to various embodiments, a request to provide a data chunk to a target storage node may be received at a source data storage node. A reference data chunk may be identified based on fingerprint information associated with the requested data chunk. The reference data chunk may be stored on the target storage node. The reference data chunk and the requested data chunk may each include a first data portion. Data chunk reconstruction information may be transmitted from the source data storage node to the target data storage node. The data chunk reconstruction information may identify the reference data chunk. The data chunk reconstruction information may include data difference information for constructing the requested data chunk at the target data storage node based on the reference data chunk.

15 Claims, 6 Drawing Sheets

(56) References Cited

U.S. PATENT DOCUMENTS

| | | | |
|---|---|---|---|
| 2012/0084519 A1* | 4/2012 | Vijayan et al. | 711/162 |
| 2013/0024435 A1* | 1/2013 | Poirier | G06F 17/30575 707/695 |
| 2013/0232125 A1* | 9/2013 | Huang et al. | 707/692 |
| 2013/0268673 A1* | 10/2013 | Graham-Cumming | H04L 67/2828 709/226 |
| 2013/0297899 A1* | 11/2013 | Kawaguchi | G06F 3/0613 711/162 |

OTHER PUBLICATIONS

Lillibridge, Mark et al., "Sparse Indexing: Large Scale, Inline Deduplication Using Sampling and Locality", HP Laboratories, Retrieved from the Internet: <http://www.hpl.hp.com/techreports/2009/HPL-2009-122.pdf>, Accessed on Dec. 29, 2013, Jun. 6, 2009, 14 pgs.

Yang, Tianming et al., "DEBAR: A Scalable High-Performance Deduplication Storage System for Backup and Archiving", CSE Technical Reports, University of Nebraska-Lincoln, Retrieved from the Internet: <http://digitalcommons.unl.edu/cgi/viewcontent.cgi?article=1059&context=csetechreports>, Accessed on Dec. 29, 2013, Jan. 5, 2009, 20 pgs.

\* cited by examiner

| Source Storage Node Fingerprint Index Portion | |
|---|---|
| Data Subchunk Identifier 102 | Chunk Identifiers 104 |
| Data Subchunk 1 Identifier | Chunk A Identifier |
| Data Subchunk 2 Identifier | Chunk B Identifier |
| Data Subchunk 3 Identifier | Chunk A Identifier, Chunk B Identifier |
| Data Subchunk 4 Identifier | Chunk A Identifier, Chunk B Identifier |
| Data Subchunk 5 Identifier | Chunk A Identifier |
| Data Subchunk 7 Identifier | Chunk A Identifier |
| Data Subchunk 8 Identifier | Chunk A Identifier |

100

| Requested Chunk |
|---|
| Data Subchunk 1 |
| Data Subchunk 2 |
| Data Subchunk 3 |
| Data Subchunk 4 |
| Data Subchunk 5 |
| Data Subchunk 6 |
| Data Subchunk 7 |
| Data Subchunk 8 |

106

| Reference Chunk (A) |
|---|
| Data Subchunk 1 |
| Data Subchunk 9 |
| Data Subchunk 3 |
| Data Subchunk 4 |
| Data Subchunk 5 |
| Data Subchunk 10 |
| Data Subchunk 7 |
| Data Subchunk 8 |

TRANSFERRING DIFFERENCES BETWEEN CHUNKS DURING REPLICATION

TECHNICAL FIELD

The present disclosure relates generally to data storage, and more specifically to the operation of storage systems in which data is replicated across different storage nodes.

DESCRIPTION OF RELATED ART

Data is often stored in storage systems that include more than one storage node on which data may be stored. In some systems, the data stored on a primary storage node may be mirrored on one or more secondary storage nodes. Data may be synchronized in this way for several purposes. For instance, storing data on more than one storage mode may provide redundancy in case of storage node failure and/or improved data access times in case one storage node receives more access requests than it can handle in a timely fashion.

Some data storage systems may perform operations related to data deduplication. In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique chunks of data, or byte patterns, are identified and stored during a process of analysis. As the analysis continues, other chunks are compared to the stored copy and a redundant chunk may be replaced with a small reference that points to the stored chunk. Given that the same byte pattern may occur dozens, hundreds, or even thousands of times, the amount of data that must be stored or transferred can be greatly reduced. The match frequency may depend at least in part on the chunk size. Different storage systems may employ different chunk sizes or may support variable chunk sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain many instances of the same one megabyte (MB) file attachment. Each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

BRIEF DESCRIPTION OF THE DRAWINGS

The disclosure may best be understood by reference to the following description taken in conjunction with the accompanying drawings, which illustrate particular embodiments of the present invention.

FIG. 1 shows an example of an arrangement of data in a storage node, arranged in accordance with one or more embodiments.

DESCRIPTION OF PARTICULAR EMBODIMENTS

Figure 2:
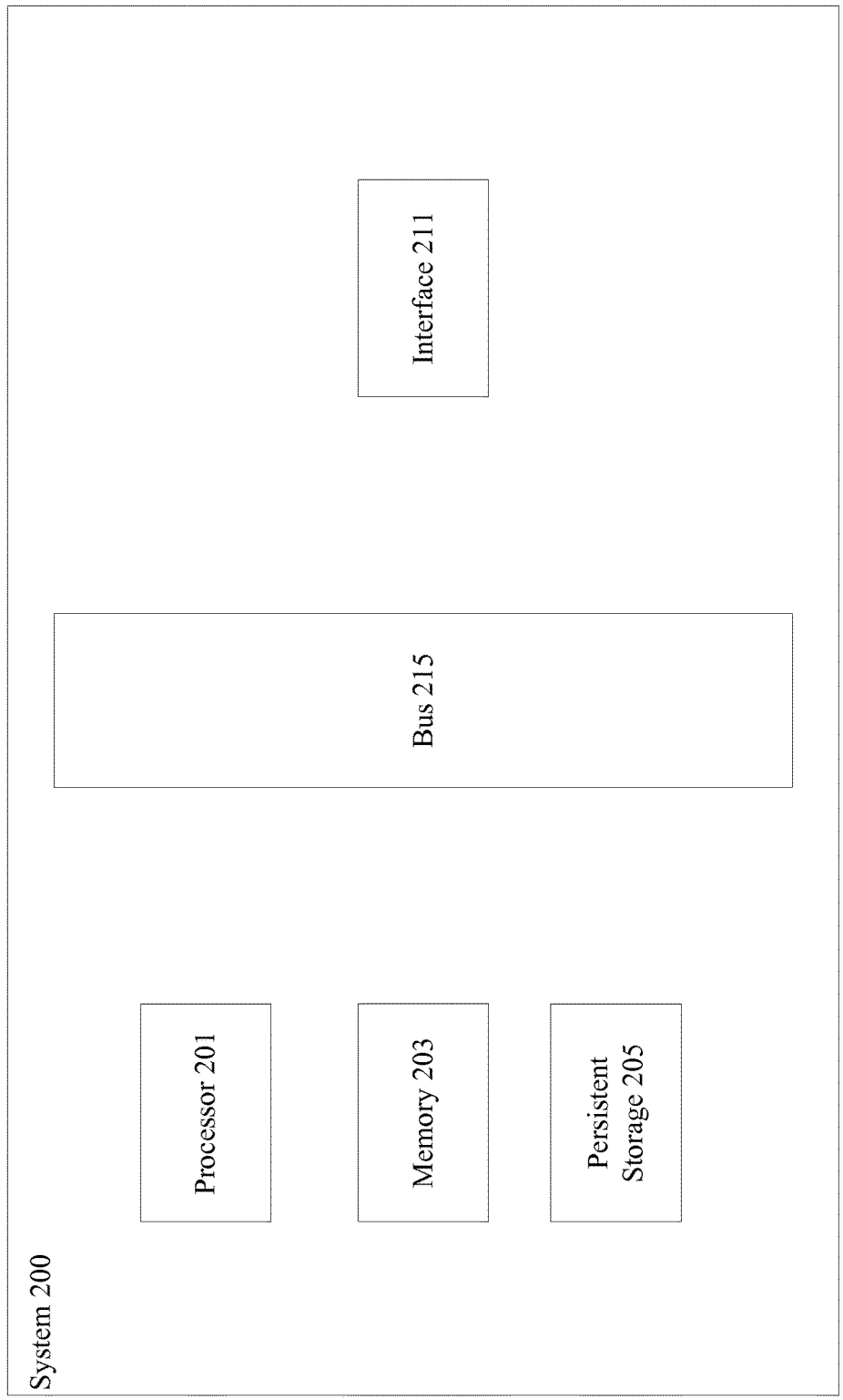
FIG. 2 illustrates a particular example of a system that can be used in conjunction with the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may replicate data from a source storage node to a target storage node. The replication source node may compute and store a set of fingerprints in a fingerprint index for each data chunk that is replicated. The fingerprint index may map each fingerprint to its corresponding chunk address. When the replication target node indicates a chunk that it needs, the source node may compute the fingerprints for the requested chunk. Then, the source node may look up each fingerprint in the fingerprint index and select the chunk address that has the highest frequency of occurrence. Next, the source node may determine a delta between the requested chunk and the selected chunk. If the delta is relatively small, then the source node may transmit to the target node an identifier for the selected chunk as well as the delta between the selected chunk and the requested chunk. Then, the target node may reconstruct the requested chunk based on the transmitted information.

Example Embodiments

In a deduplication based file-system, a file can be logically broken into a sequence of chunks. A chunk may be associated with metadata such as the offset in the file at which the chunk occurs, the chunk size, the portion of the chunk used at that offset, and a hash or fingerprint of the chunk.

In a replication storage system, files may be stored in duplicate on different storage nodes for any of a variety of purposes such as redundancy or reduced access times. When data in a storage system is replicated, new files or changes to files made on a source node are transmitted to a replication target node so that the replication target node contains an accurate replica of the data stored on the source node.

Various operations may be involved in replicating a file stored in such a system. In the first phase, chunk metadata such as chunk hashes, offset, and size information may be sent to a replication target node. The target node may consult an index based on the chunk metadata and identify the chunks that it needs the source to transfer. The target node may then transmit a message to the source node indicating the chunks that need to be transferred. In the second phase, the requested chunks may be transmitted from the source node to the target node. In the third phrase, the nodes may communicate to confirm that all chunks have been received.

In many instances, the second phase is the most time consuming since a potentially large amount of data may need to be replicated over a network link. In some instances, the network link may have a relatively small throughput when compared to other data transfer links in the system. For instance, a storage node may send and receive data via a fast internal LAN such as a 100 Mbps or 1 Gbps network. However, data replicated between storage nodes may be transmitted via a slower connection, such as a WAN link operating at speeds of 64 Kb/s to 10 Mbps.

If the amount of data to be transferred can be reduced, the transfer can be performed more quickly. One technique for reducing the volume of data transferred is compressing the data if it is compressible. Another technique for reducing the data volume is to first identify similar chunks and then transfer only the difference between the chunks. After this difference, also referred to as a "delta", is transferred from the source node to the target node, the target node can reconstruct the new chunk by applying the delta to the similar chunk.

The nature and workflow of backup applications is such that overwrites and modifications made to the files in the dataset being backed up result in incremental changes to previously stored chunks in the system or altogether new chunks. According to various embodiments, those incremental changes made to a chunk may be replicated without transferring the entire chunk.

According to various embodiments, a set of fingerprints may be computed and stored for a chunk. A fingerprint may also be referred to as a hash or checksum. Each fingerprint may correspond to an offset within the chunk. For instance, each chunk may be divided into a designated number of subchunks, and each fingerprint may correspond with a subchunk. Any of various hashing techniques may be used to compute the fingerprint. For instance, the fingerprint may be a Rabin checksum.

According to various embodiments, by storing a set of fingerprints for a chunk, a change made to a portion of the chunk may be detected since only the checksums spanning the modified ranges of the chunk will change. The rest of the checksums, which span the unchanged ranges of the chunk, will stay the same.

According to various embodiments, data storage characteristics such as the chunk size and number of fingerprints per chunk may be strategically determined based on factors such as the characteristics of the underlying storage system. For instance, the system may store 8 checksums of 64 bytes each for every chunk in an index. If the chunk size is 8 kilobytes, then a checksum is calculated over each 1 kilobyte range of the chunk.

As an illustrative example, suppose that a 100 byte modification has been made in the middle of a chunk at offset 4000 in a system with parameters as described in the preceding paragraph. In this case, the system may identify the original chunk and the modified chunk as similar since the 7 out of 8 of the checksums for the two chunks will match, with only the $5^{th}$ checksum being different.

FIG. 1 shows an example of an arrangement of data in a storage node. FIG. 1 includes a portion of a source storage node fingerprint index 100. FIG. 1 also includes a representation of a requested data chunk 106 and a reference data chunk A 108. According to various embodiments, the fingerprint index may be used to identify a reference data chunk that is similar to a requested data chunk.

According to various embodiments, a replication target node may determine that it needs to receive a particular data chunk in order to maintain a replica of data stored on a source storage node. When the replication target node makes such a determination, it transmits a request for the chunk to the source storage node.

At 106, an example of such a requested chunk is shown. A chunk may be logically divided into a number of subchunks. For instance, the requested chunk 106 is divided into subchunks numbered 1-8. These subchunks may correspond with data ranges within the chunk. For example, an 8 kilobyte chunk may be divided into 8 subchunks, each of 1 kilobyte. However, according to various implementations, the chunk size, subchunk size, and number of subchunks with a chunk may differ from the examples discussed herein.

According to various embodiments, the source storage node may hash each subchunk to determine a subchunk identifier. These subchunk identifiers may then be looked up in the source storage node fingerprint index. The source storage node fingerprint index portion corresponding with the data subchunk portions associated with the requested chunk 106 is shown at 100.

According to various embodiments, the storage node fingerprint index includes a data column associated with the data subchunk identifier 102 and a data column associated with the chunk identifiers 104. The data included in a row of the data subchunk identifier column 102 represents a fingerprint associated with a particular subchunk. The data included in a row of the chunk identifiers column 104 represents one or more identifiers each corresponding with a particular data chunk stored in the storage system.

According to various embodiments, the storage node fingerprint index may be used to identify a chunk associated with a given subchunk. When a chunk is listed in the fingerprint index as being associated with a particular subchunk, then the chunk includes the subchunk as a portion of the chunk. For instance, in FIG. 1, the first row of the fingerprint index portion indicates that the chunk A includes the data subchunk 1.

According to various embodiments, the relationship between subchunks and chunks may be one-to-one or one-to-many. For instance, the data subchunk 1 is only found in chunk A, while the data subchunk 2 is only found in chunk B. However, the data subchunk 3 is found in both chunk A and chunk B.

According to various embodiments, the source storage node may use the fingerprint index to identify a reference chunk that is similar to a requested chunk. For instance, in FIG. 1, the requested chunk includes 8 different subchunks, number 1-8. The storage node fingerprint index indicates that the data subchunks 1, 3, 4, 5, 7, and 8 are each part of the chunk A. The index also indicates that the data subchunks 2, 3, and 4 are each part of the chunk B. Finally, the index indicates that the data subchunk 6 is not part of any chunk referenced by the fingerprint index.

At 108, a representation of the reference chunk A 108 is shown. In FIG. 1, the chunk A is the chunk that is most similar to the requested chunk 106 because the chunk A has the highest frequency of matches in the fingerprint index portion to the data subchunks included within the requested chunk 106. For instance, as shown at 108, the reference chunk A includes the data subchunks 1, 3, 4, 5, 7, and 8 that are each part of the requested chunk 106. The reference chunk A also includes the data subchunks 9 and 10 that are not part of the requested chunk 106. Thus, 6 out of 8 of the subchunks of the requested chunk 106 may be found within the reference chunk 108. In contrast, only 3 of the subchunks of the requested chunk 106 (subchunks 2, 3, and 4) are part of the chunk B. Therefore, chunk A is a closer match to the requested chunk than chunk B.

According to various embodiments, the similarity between the requested chunk 106 and the reference chunk A 108 may be used to reduce the amount of data transmitted from the data source node and the target replication node in response to the request for the requested chunk 106. For instance, instead of sending each of the data subchunks that form the requested chunk 106, the source storage system may transmit data for reconstructing the requested chunk 106. This data may include information such as an identifier corresponding to the reference chunk A 108, the missing data subchunks 2 and 6, and any metadata capable of being used to perform the reconstruction.

According to various embodiments, various types of information may be stored within the fingerprint index. For example, the fingerprint index may store offset information that indicates a location within the chunk at which a subchunk is located. The offset information may be stored in conjunction with the fingerprint information, in conjunction with the chunk identification information, or in a separate data column. In particular embodiments, a match between a subchunk fingerprint and a chunk in the fingerprint index may include a match on offset as well as fingerprint. Alternately, a match between a subchunk fingerprint and a chunk may occur even if the subchunk offset does not match.

It should be noted that FIG. 1 depicts only a portion of an example arrangement of data on a storage system. In replicated storage systems, each storage node may store many different chunks. Accordingly, the fingerprint index at the source node may potentially be quite long and may indicate relationships between many different subchunks and many different chunks.

A variety of devices and applications can implement particular examples of the present invention. FIG. 2 illustrates one example of a system that can be used as a storage node in a deduplication system. According to particular example embodiments, a system 200 suitable for implementing particular embodiments of the present invention includes a processor 201, a memory 203, an interface 211, persistent storage 205, and a bus 215 (e.g., a PCI bus). When acting under the control of appropriate software or firmware, the processor 201 is responsible for such tasks such as optimization. Various specially configured devices can also be used in place of a processor 201 or in addition to processor 201. The complete implementation can also be done in custom hardware. The interface 211 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 205 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 200 uses memory 203 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 3:
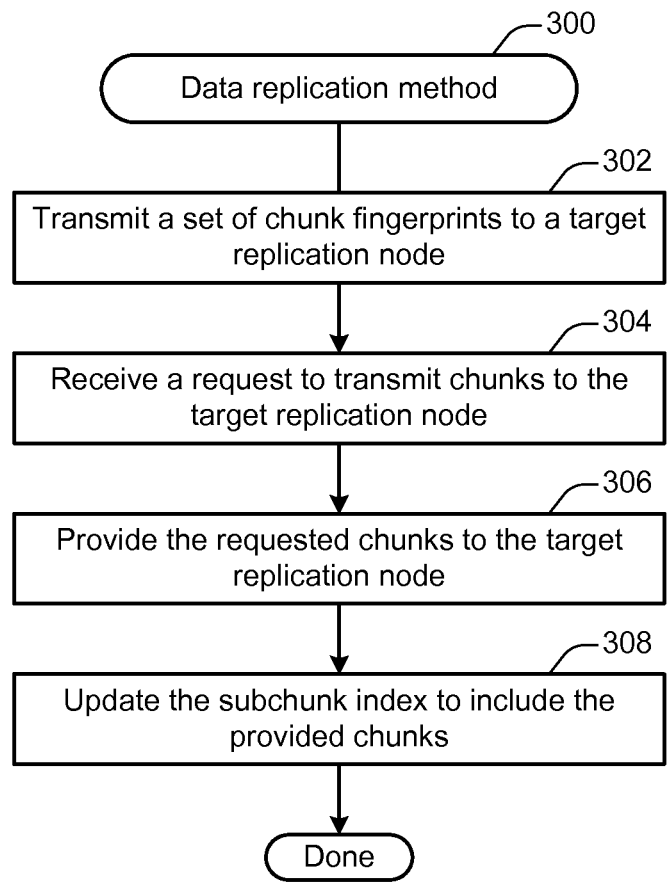
FIG. 3 illustrates a data replication method, performed in accordance with one or more embodiments

FIG. 3 illustrates a data replication method 300, performed in accordance with one or more embodiments. According to various embodiments, the method 300 may be performed at a source storage node in communication with a target replication node. The method 300 may be used to replicate data stored on the source storage node to the target replication node. After replication, the replicated data is available on both nodes.

According to various embodiments, the method 300 may be performed at any of various times. For example, the method 300 may be performed when new data is received for storage on the source storage node. As another example, replication may be performed periodically, at scheduled times, or upon request.

At 302, a set of chunk fingerprints are transmitted to the target replication node. According to various embodiments, each chunk fingerprint is a hashed value that is computed by applying a hash function such as a Rabin hash to the underlying chunk data.

According to various embodiments, each chunk may be a file, a portion of a file, or any other range of data that may be stored in a storage system. The techniques and mechanisms described herein apply generally to a wide variety of storage systems including storage systems that differ in terms of characteristics such as chunk size.

According to various embodiments, the chunk fingerprint may be used by the target replication node to determine whether the target replication node is missing the chunk corresponding to the chunk fingerprint. For instance, the target replication node may use a chunk fingerprint to look up the chunk in a database indexed by chunk fingerprint to determine whether the chunk is stored on the target replication node. If the chunk is already present on the target replication node, then the target replication node need not request the chunk from the source node.

According to various embodiments, the hashing function used to generate the chunk fingerprint need not uniquely identify a particular chunk. For instance, a data chunk may include 8 kilobytes of data, while a chunk fingerprint may be 64 bytes, 512 bytes, or some other size. In this case, a given chunk fingerprint may potentially correspond to two different chunks. However, in the event of such a collision, the target replication node may simply need to send a subsequent request for a chunk that at first appeared to be stored on the target replication node but in actuality was not.

At 304, a request is received to transmit chunks to the target replication node. According to various embodiments, the requested chunks may include those that are not yet stored on the target replication node. The requested chunks may be identified by chunk identifiers or by the chunk fingerprints transmitted from the source node to the target node.

At 306, the requested chunks are provided to the target replication node. According to various embodiments, each chunk may be provided in any of various ways. For example, in some instances the entire chunk may be transferred. In other instances, an identifier for a reference chunk may be transmitted along with delta information for reconstructing the requested chunk from the reference chunk. Techniques for providing requested chunks to the target replication node are discussed in further detail with respect to FIG. 4. Techniques for reconstructing a requested chunk from a reference chunk are discussed in further detail with respect to FIG. 6.

At 308, the subchunk index is updated to include the provided chunks. An example of a subchunk index is shown in FIG. 1. According to various embodiments, updating the subchunk index may involve storing or updating entries for each subchunk of a replicated chunk when necessary. For instance, if a new chunk is transmitted to the target replication node, then the subchunk index is updated to indicate an association between the new chunk and a subchunk fingerprint for each subchunk of the new chunk.

Figure 4:
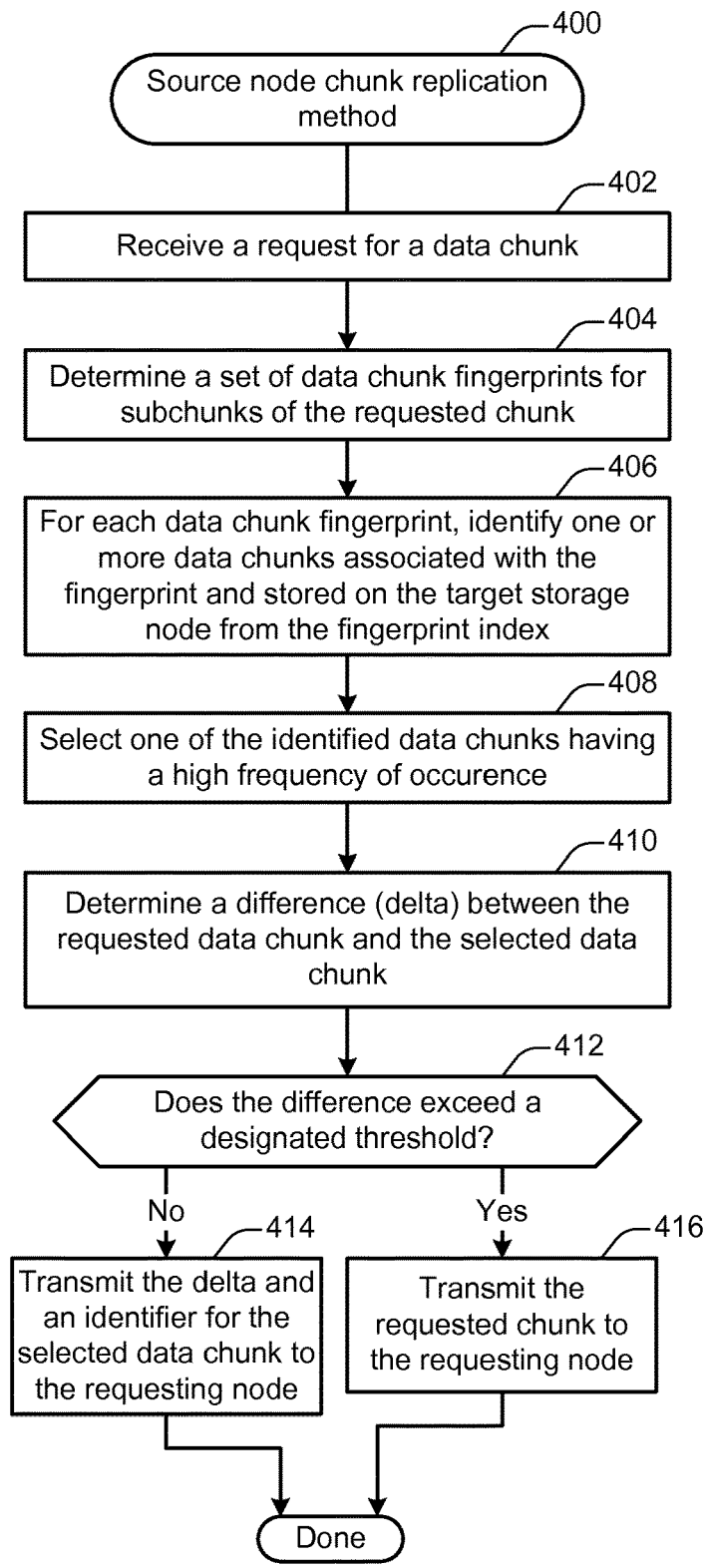
FIG. 4 illustrates a source node chunk replication method, performed in accordance with one or more embodiments.

FIG. 4 illustrates a source node chunk replication method 400, performed in accordance with one or more embodiments. According to various embodiments, the method 400 may be performed at a source storage node in communication with a target storage node. The source storage node may be configured to provide data for replication to the target storage node. The method 400 may be performed during the process of replication, when a request is received to replicate data to the target storage node.

At 402, a request for a data chunk is received. According to various embodiments, the request may be received in response to a determination that the data chunk should be stored at the target storage node in order to replicate corresponding data stored on the source storage node. For instance, the request may be received in response to a set of fingerprints transmitted to the target replication node, as discussed with respect to operations 302 and 304 in FIG. 3.

According to various embodiments, the request may identify the data chunk in any of various ways. For example, the request may include an identifier and/or a fingerprint corresponding with the requested data chunk.

At 404, a set of data chunk fingerprints for subchunks of the requested chunk are determined. According to various embodiments, the set of data chunk fingerprints may be determined by first dividing the data chunk into subchunks. For instance, an 8 kilobyte chunk may be divided into 1 kilobyte chunks. Then, a hash function may be applied to each data chunk to produce a corresponding fingerprint. Any of various types of hash functions may be used. For instance, the system may employ a Rabin hash function.

At 406, one or more data chunks associated with the fingerprint and stored on the target storage node are identified from the fingerprint index. According to various embodiments, the one or more data chunks may be identified by looking up each fingerprint in the fingerprint index. As discussed with respect to FIG. 1, the subchunk fingerprint index maps each subchunk fingerprint to a chunk in which the subchunk is included. Each subchunk fingerprint may be associated with zero, one, two, or more chunks.

According to various embodiments, identifying the one or more data chunks may involve creating a frequency list. According to various embodiments, a frequency list may identify a number of data chunks that include subchunks within the requested data chunk. For each of the identified data chunks, a number of subchunks included the identified data chunk may also be determined.

For instance, in FIG. 1, the chunk A includes 6 subchunks that overlap with the requested chunk, while the chunk B includes 3 subchunks that overlap with the requested chunk. Accordingly, a frequency list for the requested chunk 106 shown in FIG. 1 would include chunk A linked with the frequency count 6 and the chunk B linked with the frequency count 3.

At 408, one of the identified data chunks having a high frequency of occurrence is selected. According to various embodiments, the selected chunk may be the chunk identified at operation 406 that has the highest frequency of occurrence. For instance, the frequency list may be sorted, and the highest frequency chunk may be selected. For example, in FIG. 1, the subchunk A is selected. The highest frequency chunk may be the chunk that has the most overlap with the requested chunk.

At 410, a difference (or delta) between the requested data chunk and the selected data chunk are determined. According to various embodiments, the delta may represent the data included in the requested data chunk that is not also within the selected (or reference) data chunk. For instance, in FIG. 1, the delta between the requested data chunk and the reference data chunk A is the set of two subchunks corresponding to subchunk 2 and subchunk 6.

In particular embodiments, identifying the delta may involve calculating a difference via an algorithm such as the VCDIFF algorithm for delta encoding. The VCDIFF algorithm may identify delta data to include in conjunction with the reference chunk data as well as metadata for combining the delta data with the reference chunk data.

In particular embodiments, identifying the delta may involve identifying metadata for combining the delta data with the reference data chunk. For instance, the metadata may include offset information. The offset information may indicate that the subchunk 2 is located in the second position, while the subchunk 6 is located in the sixth position.

At 412, a determination is made as to whether the difference data exceeds a designated threshold. According to various embodiments, the designated threshold may be strategically determined based on any of various factors such as the chunk size, the subchunk size, and the amount of metadata information needed to reconstruct a requested chunk from a reference chunk.

According to various embodiments, the determination made at 412 may reflect the various tradeoffs involved in reconstructing the requested chunk at the target node. For example, reconstructing the requested chunk at the target node involves some amount of computing resources. As another example, delta information, reference chunk identification information, and metadata information may still need to be transmitted from the source node to the target node. As yet another example, some chance may exist that the reference node is not actually present on the target storage node, which may involve additional network traffic such as transferring request messages and the entire requested node. Accordingly, if the reconstruction information is not significantly smaller than the size of the requested data chunk, then transmitting the entire requested data chunk may be more efficient than transmitting the requested information.

At 414, the delta information and an identifier for the selected data chunk are transmitted to the requesting node. According to various embodiments, the information transmitted may include any information for reconstructing the requested chunk at the target node. For instance, the information transmitted may include metadata information such as offset data that identifies the location within the chunk at which the delta information is located.

At 416, the requested chunk is transmitted to the requesting node. As discussed with respect to operation 412, the entire requested chunk may be transmitted if transmitting difference information is inefficient for any of various reasons. Alternately, the entire requested chunk may be transmitted if no similar reference node is stored on the target node for use in reconstructing the requested chunk.

Figure 5:
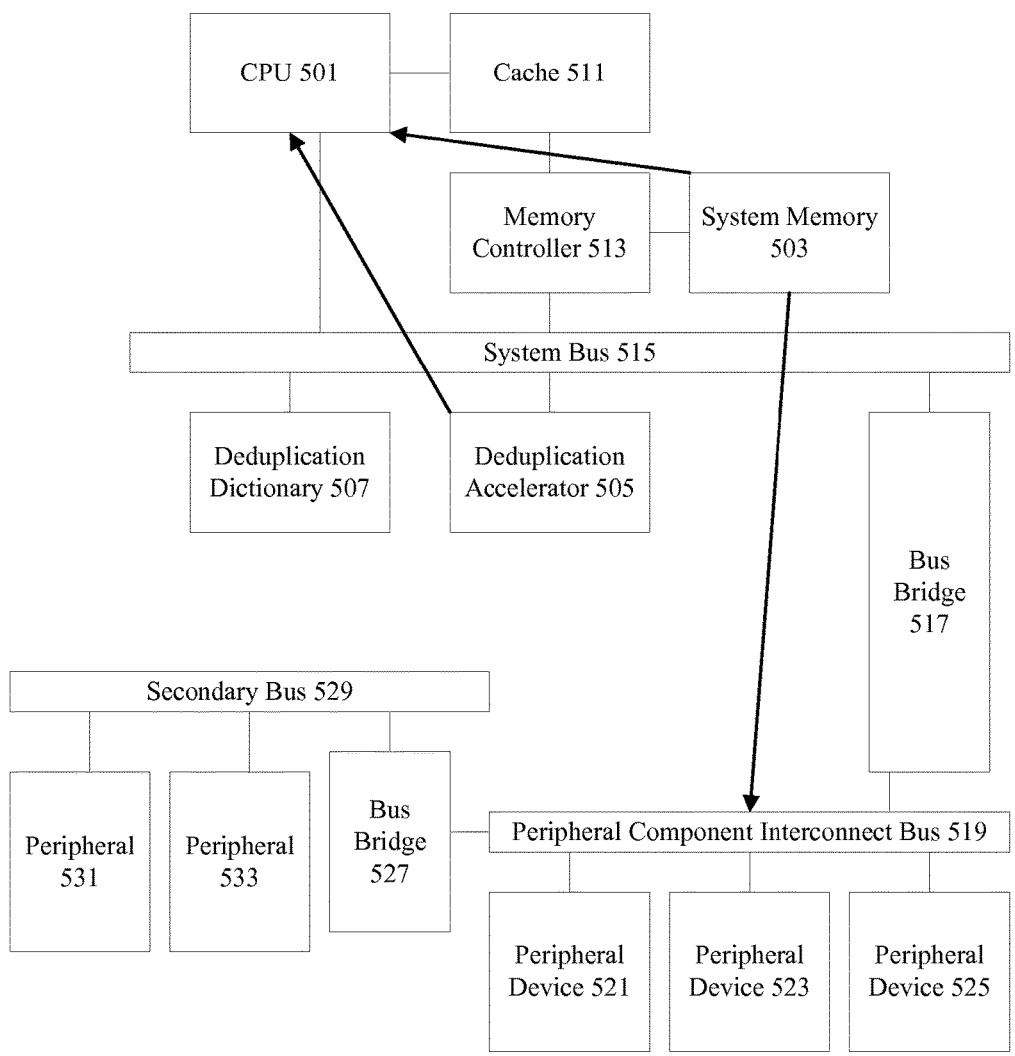
FIG. 5 illustrates a particular example of a storage system.

FIG. 5 illustrates a particular example of a system that can be uses in conjunction with the techniques and mechanisms of the present invention. According to various embodiments, data is received at an accelerated deduplication system 500 over an interface such as a network interface. A data stream may be received in segments or blocks and maintained in system memory 503. According to various embodiments, a processor or CPU 501 maintains a state machine but offloads boundary detection and fingerprinting to a deduplication engine or deduplication accelerator 502. The CPU 501 is associated with cache 511 and memory controller 513. According to various embodiments, cache 511 and memory controller 513 may be integrated onto the CPU 501.

In particular embodiments, the deduplication engine or deduplication accelerator 505 is connected to the CPU 501 over a system bus 515 and detects boundaries using an algorithm such as Rabin to delineate segments of data in system memory 503 and generates fingerprints using algorithms such as hashing algorithms like SHA-1 or MD-5. The deduplication engine 505 accesses the deduplication dictionary 507 to determine if a fingerprint is already included in the deduplication dictionary 507. According to various embodiments, the deduplication dictionary 507 is maintained in persistent storage and maps segment fingerprints to segment storage locations. In particular embodiments, segment storage locations are maintained in fixed size extents. Datastore suitcases, references, metadata, etc., may be created or modified based on the result of the dictionary lookup.

If the data needs to be transferred to persistent storage, the optimization software stack will communicate to the CPU 501 the final destination direct memory access (DMA) addresses for the data. The DMA addresses can then be used to transfer the data through one or more bus bridges 517 and/or 527 and secondary buses 519 and/or 529. In example of a secondary bus is a peripheral component interconnect (PCI) bus 519. Peripherals 551, 523, 525, 531, and 533 may be peripheral components and/or peripheral interfaces such as disk arrays, network interfaces, serial interfaces, timers, tape devices, etc.

Figure 6:
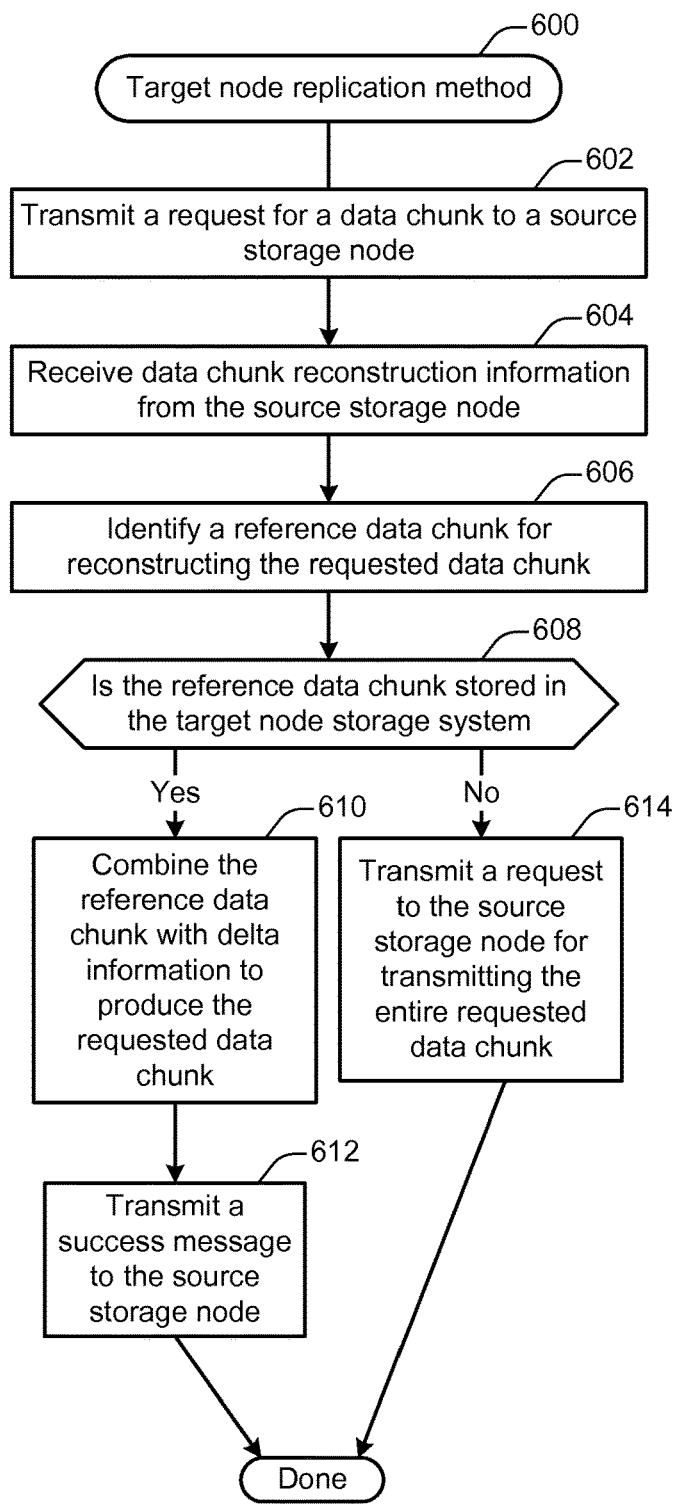
FIG. 6 illustrates a target node chunk replication method, performed in accordance with one or more embodiments.

FIG. 6 illustrates a target node chunk replication method 600, performed in accordance with one or more embodiments. According to various embodiments, the method 600 may be performed at a target storage node configured to replicate data stored on a source storage node. The target storage node may be performed during a replication operation for ensuring that the data stored on the target storage node is the same as corresponding data stored on the source storage node.

At 602, a request for a data chunk is transmitted to a source storage node. According to various embodiments, the requested data chunk may be a portion of data to be replicated from the source storage node to the target storage node. For instance, the requested data chunk may be a data chunk identified based on a set of chunk fingerprints transmitted from the source storage node to the target storage node as discussed with respect to operation 302 discussed with respect to FIG. 3.

According to various embodiments, the request may identify the data chunk in any of various ways. For instance, the request may include an identifier associated with the data chunk. Alternately, or additionally, the request may include a fingerprint value associated with the requested data chunk.

At 604, data chunk reconstruction information is received from the source storage node. According to various embodiments, the data chunk reconstruction information may include any information capable of being used to create the requested data chunk. For instance, the data chunk reconstruction information may include an identifier corresponding to a reference data chunk, delta data that represents a difference in data between the reference data chunk and the requested data chunk, and/or metadata information for use in combining the reference data chunk with the delta data to create the requested data chunk.

At 606, a reference data chunk for reconstructing the requested data chunk is identified. According to various embodiments, the reference data chunk may be identified based on information included in the data chunk reconstruction information received at operation 604.

At 608, a determination is made as to whether the reference data chunk is stored in the target node storage system. In some instances, the source storage node may have out-of-date information regarding which data chunks are stored on the target storage node. For instance, an intervening operation between the time at which the source storage node determines that a data chunk is stored on the target storage node and the time at which the data chunk reconstruction information is received from the source storage node may have caused the reference data chunk to be deleted from the source storage node.

According to various embodiments, the determination made at operation 608 may be made at least in part by looking up information associated with the reference data chunk in a data dictionary residing at the target storage node. For instance, in a deduplication storage system, a data dictionary may indicate a storage location corresponding to each data chunk residing in the storage system, indexed by an identifier associated with each data chunk.

At 610, the reference data chunk is combined with delta information to produce the requested data chunk. According to various embodiments, combining the reference data chunk with the delta information may involve any operations related to reconstructing the requested data chunk at the target storage node. For example, the data corresponding with the reference data chunk may be retrieved from the storage system. Then, the delta information may be added in the appropriate positions in the reference data chunk to create the requested data chunk. The data chunk reconstruction information may include metadata such as subchunk offsets that indicate one or more locations within the reference data chunk at which the delta information should be placed.

At 612, a success message is transmitted to the source storage node. According to various embodiments, the success message may identify the requested chunk. For instance, the success message may include an identifier corresponding with the requested chunk and/or a fingerprint that identifies the requested chunk.

According to various embodiments, transmitting the success message to the source storage node may allow the source storage node to update the fingerprint index stored at the source storage node. In this way, the source storage node may be informed of the data stored at the target replication storage node. Then, when subsequent requests for data chunks are received at the source storage node, the source storage node may respond by determining whether to send the entire data chunk or data chunk reconstruction information, as discussed herein.

At 614, a request to the source storage node for transmitting the entire requested data chunk is transmitted. According to various embodiments, as discussed with respect to 608, an intervening action may have caused the reference data chunk to be no longer stored in the target node storage system. In this case, the target node may be unable to reconstruct the requested node from the reference node. Accordingly, the target node may transmit a new request for the source storage node to transmit the entire requested data chunk. Alternately, the source storage node may transmit reconstruction information based on a different reference data chunk.

Although FIGS. 4 and 6 are described in the context of the replication of a single data chunk, potentially many different data chunks may be replicated. In this case, the operations discussed with respect to FIGS. 4 and 6 may be performed separately for each data chunk or may be combined for more than one data chunk. For example, data chunk reconstruction information may be received for potentially more than one data chunk in the same message or series of messages between the two nodes. As another example, the success message transmitted to the source storage node may identify a range or group of data chunks successfully stored at the target storage node.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
receiving, at a source data storage node, a request to provide a data chunk to a target storage node, the source data storage node storing a plurality of data chunks, each data chunk including a plurality of subchunks;
identifying a reference data chunk based on fingerprint information associated with the requested data chunk, the reference data chunk being stored on the target storage node, the reference data chunk and the requested data chunk each including a first data portion, the requested chunk including a plurality of subchunks, the first data portion including a first one or more of the plurality of subchunks, wherein identifying the reference data chunk includes:
creating a frequency list that identifies a number of data chunks that include subchunks within the requested data chunk;
selecting from the frequency list the data chunk with the highest frequency of subchunk overlap between the subchunks in the requested data chunk and the subchunks in each of the plurality of data chunks stored at the storage node; and
setting, as the reference data chunk, the data chunk with the highest frequency of subchunk overlap between the subchunks in the requested data chunk and the subchunks in each of the plurality of data chunks stored at the storage node;
determining data difference information between the reference data chunk and the requested data chunk;
determining, based on the data difference information, data chunk reconstruction information and a size of the data chunk reconstruction information;
transmitting the data chunk reconstruction information from the source data storage node to the target data storage node if it is determined that the size of the data chunk reconstruction information is below a designated size threshold, the data chunk reconstruction information identifying the reference data chunk, the data chunk reconstruction information including the data difference information and metadata for constructing the requested data chunk at the target data storage node based on the reference data chunk, the data difference information including a second data portion included in the requested data chunk but not included in the reference data chunk, the second data portion including a second one or more of the plurality of subchunks, the metadata including subchunk offset information for combining the data difference information with the reference data chunk; and
transmitting the requested data chunk if it is determined that the size of the data chunk reconstruction information exceeds the designated size threshold.

2. The method recited in claim 1, wherein the fingerprint information includes a hash value generated by applying a hash function to at least a portion of the requested data chunk.

3. The method recited in claim 2, wherein the requested chunk includes a plurality of subchunks, the first data portion including designated ones of the plurality of subchunks, the fingerprint information including a respective hash value for each of the plurality of subchunks, each respective hash value being generated by applying a hash function to the respective sub chunk.

4. The method recited in claim 1, wherein identifying the reference data chunk comprises locating the fingerprint information in an index, the index mapping fingerprint information to data chunk portions.

5. The method recited in claim 4, wherein the identifying the reference data chunk further comprises identifying a plurality of related data chunks, the related data chunks including the reference data chunk, each of the plurality of related data chunks being associated with the fingerprint information in the index, each of the plurality of related data chunks having a respective data portion that overlaps with the requested data chunk.

6. The method recited in claim 1, wherein the reference data chunk and the requested data chunk are each stored in a storage system at the source data storage node, the storage system being operable to perform one or more operations for data deduplication.

7. The method recited in claim 6, wherein the target storage node is operable to replicate data stored on the source data storage node.

8. A system comprising:
a storage system operable to store a plurality of data chunks, each data chunk including a plurality of subchunks;
a processor operable to:
identify a reference data chunk based on fingerprint information associated with a data chunk requested by a target storage node, the reference data chunk being stored on the target storage node, the reference data chunk and the requested data chunk each including a first data portion, the requested chunk including a plurality of subchunks, the first data portion including a first one or more of the plurality of subchunks, wherein identifying the reference data chunk includes:
creating a frequency list that identifies a number of data chunks that include subchunks within the requested data chunk;
selecting from the frequency list the data chunk with the highest frequency of subchunk overlap between the subchunks in the requested data chunk and the subchunks in each of the plurality of data chunks stored at the storage node; and
setting, as the reference data chunk, the data chunk with the highest frequency of subchunk overlap between the subchunks in the requested data chunk and the sub chunks in each of the plurality of data chunks stored at the storage node;
determine data difference information between the reference data chunk and the requested data chunk;
determine, based on the data difference information, data chunk reconstruction information and a size of the data chunk reconstruction information; and
a communications interface operable to:
transmit the data chunk reconstruction information to the target data storage node if it is determined that the size of the data chunk reconstruction information is below a designated size threshold, the data chunk reconstruction information identifying the reference data chunk, the data chunk reconstruction information including data difference information and metadata for constructing the requested data chunk at the target data storage node based on the reference data chunk, the data difference information including a second data portion included in the requested data chunk but not included in the reference data chunk, the second data portion including a second one or more of the plurality of subchunks, the metadata including subchunk offset information for combining the data difference information with the reference data chunk; and
transmit the requested data chunk if it is determined that the size of the data chunk reconstruction information exceeds the designated size threshold.

9. The system recited in claim 8, wherein the fingerprint information includes a hash value generated by applying a hash function to at least a portion of the requested data chunk.

10. The system recited in claim 9, wherein the requested chunk includes a plurality of subchunks, the first data portion including designated ones of the plurality of subchunks, the fingerprint information including a respective hash value for each of the plurality of subchunks, each respective hash value being generated by applying a hash function to the respective subchunk.

11. The system recited in claim 8, wherein identifying the reference data chunk comprises locating the fingerprint information in an index, the index mapping fingerprint information to data chunk portions.

12. The system recited in claim 11, wherein the identifying the reference data chunk further comprises identifying a plurality of related data chunks, the related data chunks including the reference data chunk, each of the plurality of related data chunks being associated with the fingerprint information in the index, each of the plurality of related data chunks having a respective data portion that overlaps with the requested data chunk.

13. The system recited in claim 8, wherein the reference data chunk and the requested data chunk are each stored in a storage system, the storage system being operable to perform one or more operations for data deduplication.

14. The system recited in claim 13, wherein the target storage node is operable to replicate data stored on the source data storage node.

15. One or more non-transitory computer readable media having instructions stored thereon that, when executed by a processor, cause a system to perform operations comprising:
receiving, at a source data storage node, a request to provide a data chunk to a target storage node, the source data storage node storing a plurality of data chunks, each data chunk including a plurality of subchunks;
identifying a reference data chunk based on fingerprint information associated with the requested data chunk, the reference data chunk being stored on the target storage node, the reference data chunk and the requested data chunk each including a first data portion, the requested chunk including a plurality of subchunks, the first data portion including a first one or more of the plurality of subchunks, wherein identifying the reference data chunk includes:
creating a frequency list that identifies a number of data chunks that include subchunks within the requested data chunk;
selecting from the frequency list the data chunk with the highest frequency of subchunk overlap between the subchunks in the requested data chunk and the subchunks in each of the plurality of data chunks stored at the storage node; and setting, as the reference data chunk, the data chunk with the highest frequency of subchunk overlap between the subchunks in the requested data chunk and the subchunks in each of the plurality of data chunks stored at the storage node;

determining data difference information between the reference data chunk and the requested data chunk;

determining, based on the data difference information, data chunk reconstruction information and a size of the data chunk reconstruction information;

transmitting the data chunk reconstruction information from the source data storage node to the target data storage node if it is determined that the size of the data chunk reconstruction information is below a designated size threshold, the data chunk reconstruction information identifying the reference data chunk, the data chunk reconstruction information including data difference information calculated using a VCDIFF algorithm and metadata for constructing the requested data chunk at the target data storage node based on the reference data chunk, the data difference information including a second data portion included in the requested data chunk but not included in the reference data chunk, the second data portion including a second one or more of the plurality of subchunks, the metadata including subchunk offset information for combining the data difference information with the reference data chunk; and transmitting the requested data chunk if it is determined that the size of the data chunk reconstruction information exceeds the designated size threshold.

* * * * *